United States Patent [19]
Bertiger et al.

[11] Patent Number: 5,604,920
[45] Date of Patent: *Feb. 18, 1997

[54] SATELLITE CELLULAR TELEPHONE AND DATA COMMUNICATION SYSTEM

[75] Inventors: Bary R. Bertiger, Scottsdale; Raymond J. Leopold, Chandler; Kenneth M. Peterson, Tempe, all of Ariz.

[73] Assignee: Motorola, Inc., Schaumburg, Ill.

[*] Notice: The term of this patent shall not extend beyond the expiration date of Pat. No. 5,410,728.

[21] Appl. No.: 363,065

[22] Filed: Dec. 22, 1994

Related U.S. Application Data

[63] Continuation of Ser. No. 50,753, Apr. 21, 1993, Pat. No. 5,410,728.
[51] Int. Cl.$^6$ .................... H04B 7/185; H04M 11/00
[52] U.S. Cl. ............... 455/13.1; 455/13.2; 455/33.2; 455/33.4; 455/56.1; 379/60
[58] Field of Search .................... 455/12.1, 13.1, 455/13.2, 13.3, 13.4, 33.1, 33.2, 33.3, 33.4, 34.1, 54.1, 56.1; 379/59, 60; 342/353; 370/104.1

[56] References Cited

U.S. PATENT DOCUMENTS 5,396,643  3/1995  Frenzer et al. ................ 455/13.1
5,408,237  4/1995  Patterson et al. .............. 455/12.1
5,410,728  4/1995  Bertiger et al. ............... 455/13.1

OTHER PUBLICATIONS

"Crosslink Archeitectures for a Multiple Satellite System"; Binder et al; IEEE, vol. 75, No. 1 Jan. 1987; pp. 74–81.

"Landmobile Satellites Pick Up Where Cellular Radio Leaves Off", Kachmar, *Microwaves & RF;* Aug. 1984; pp. 33–35.

*Primary Examiner*—Andrew Faile
*Attorney, Agent, or Firm*—Frank J. Bogacz

[57] ABSTRACT

A system for facilitating global cellular/trunked mobile communication is disclosed. This system permits communication with hand held and mobile mounted cellular telephones. The system permits two-way communications anywhere on or above the earth up to a particular height above the earth of several hundred nautical miles. The system employs a number of low-earth orbiting satellites moving about the earth in orbit. Links are provided from the satellites directly to the users and via the public switched telephone network to other users. The satellites are interconnected via links in a ring structure surrounding the earth. Switching is performed by each of the satellites. In addition, each of the satellites hands off a call as it moves out of the range of a particular user.

7 Claims, 3 Drawing Sheets

5,604,920

SATELLITE CELLULAR TELEPHONE AND DATA COMMUNICATION SYSTEM

This is a continuation of Ser. No. 08/050,753, filed Apr. 21, 1993, now U.S. Pat. No. 5,410,728.

BACKGROUND OF THE INVENTION

The present invention pertains to global mobile communications and more particularly to a satellite cellular telephone and data communication system.

Present geostationary satellite communication systems allow point-to-point communication. That is, the satellite functions as a relay station or a "bent pipe". The satellite simply receives information from one point on earth and transmits it to another fixed point on earth.

One such point-to-point satellite communication system is shown in U.S. Pat. No. 4,720,873. This system shows point-to-point communications through a satellite for network programming and advertising purposes.

Some basic multiplexing functions may be supplied within the satellites of a satellite communication system. One such system is shown in U.S. Pat. No. 4,480,328. This patent teaches a satellite communication system in which the satellite is a relay station for TDMA multiplexed data.

The above-mentioned systems and other systems teach the use of a single satellite for communications from one point to another. These satellite systems show no selectivity or switching of data among a plurality of users.

Accordingly, it is an object of the present invention to provide a global low-earth orbiting multiple satellite cellular communication system which interfaces directly among a number of cellular telephone and data transmission equipped users and also interfaces these users to the public switched telephone network (PSTN).

SUMMARY OF THE INVENTION

In accomplishing the object of the present invention, a novel satellite cellular telephone and data communication system is shown.

A satellite cellular telephone communication system establishes communication among a plurality of users. This communication system includes satellite switches positioned in low-earth orbit. Wireless communication links couple the users to the satellite switches. The satellite switches establish a communication link between selected ones of the users.

Each users's present location is determined and the system is periodically updated. Then the satellites relay these locations to the proper ground-based data base for storage. When a mobile user places a call, the satellite which is in his spacial vicinity handles the call. When a mobile user is called, the satellite switches route the call through the appropriate satellites to the called user's current location. Other user-unique data may also be stored at these same data base storage sites.

DESCRIPTION OF THE PREFERRED EMBODIMENT

Figure 1:
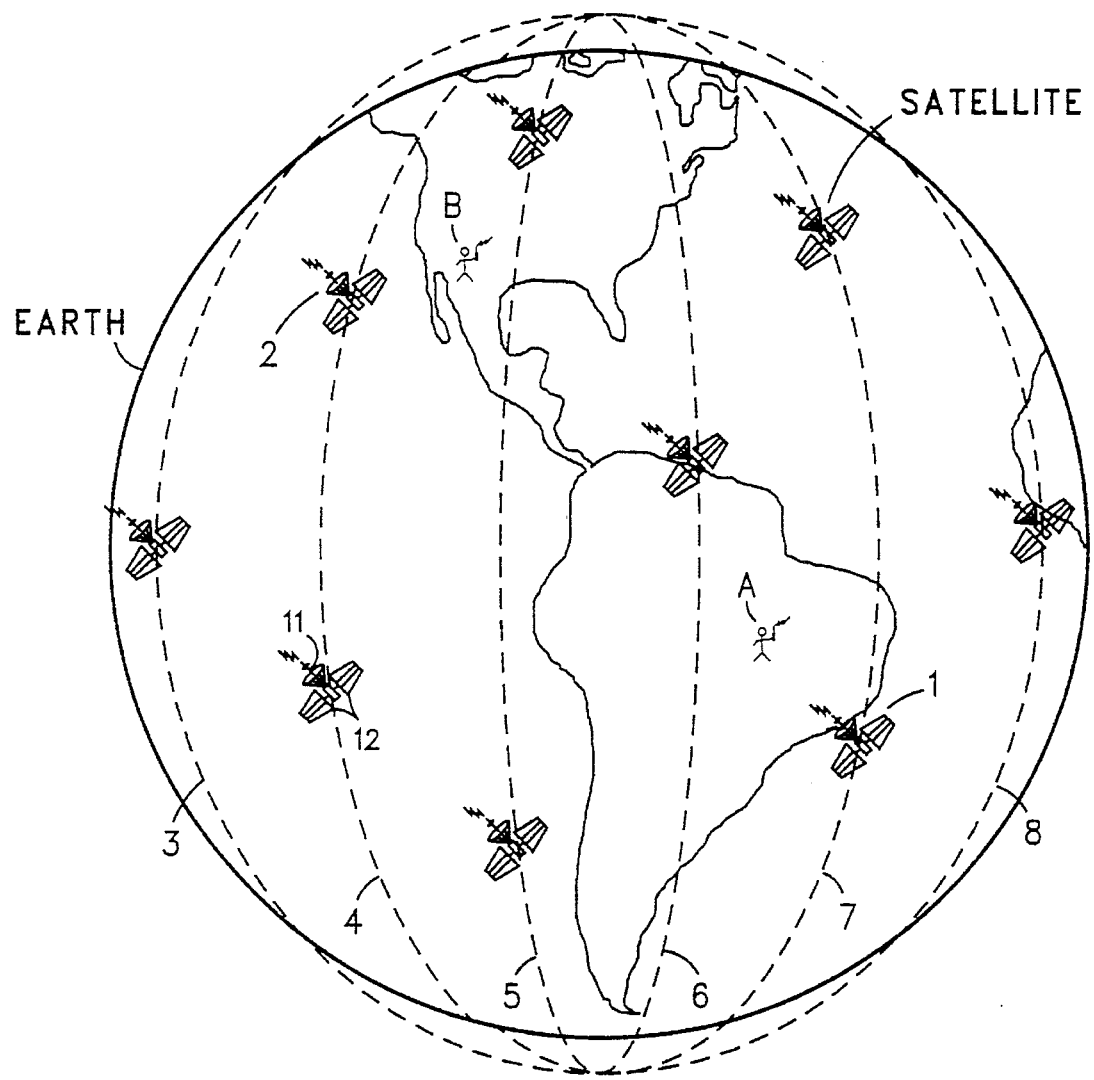
FIG. 1 is a layout diagram depicting the satellite switching system configuration of the present invention.

Referring to FIG. 1, a satellite configuration for the satellite cellular telephone communication system is shown. In this configuration, a number of satellites are shown in low-earth orbit. A number of satellites are placed in each orbiting plane. There are several orbiting planes (3 through 8) as shown which are highly inclined in nature and provide switching coverage for the entire earth.

This satellite cellular structure is somewhat analogous to the present day cellular mobile telephone system. In that system, cellular sites are fixed and users are mobile. As a user travels from one cell site to another, his telephone call is handed off from one cellular switching unit to another.

In the present invention, users are relatively fixed at any given time while the satellites, which are the cells, are in continuous movement. With a handheld or mobile mounted cellular telephone, connection to one of the satellite switches shown in FIG. 1 is made directly from the handheld mobile mounted or remotely fixed telephone to one of the nearest satellite switches. Each satellite is moving about the earth. As the satellite which originally acted as the switching unit for a particular user leaves a cell of that switch, the user's call is "handed off" to the appropriate adjacent cell. Adjacent cells may be cells within one satellite or cells of other satellites located either in a particular orbiting plane or an adjacent orbiting plane. Users may "roam", but this roaming distance is relatively small compared to the traveling distance of the satellite switches.

Similar to the cellular mobile telephone system, the satellite cellular communication system provides spectral efficiency. This means that the same frequency may be simultaneously used by different satellite switches. Spectral efficiency is provided by the spacial diversity between the satellite switches and users.

The users may be located anywhere on a land mass, on the water or in the air at an altitude less than that of the low-earth orbiting satellites. For example, a person on one land mass could call a person on another land mass, a person on a boat or a person in an aircraft.

Low power handheld mobile mounted or fixed radio telephones may be used in this system. The power requirement is less than 10 watts with present technology.

In this system, each satellite shown is a switching unit. Current satellite communication systems act primarily as a relay station or "bent pipe". That is, they provide fixed point-to-point communications. In the present invention, a switching function is provided within each of the orbiting satellites.

As previously mentioned, each of the orbiting planes of satellites is highly inclined in the preferred embodiment of the invention. Orbiting satellite planes with lower inclination are also workable. However, the lower inclination requires more satellite switching units and/or higher orbiting altitudes to achieve whole earth coverage than does the highly inclined orbiting satellite configuration.

In a preferred embodiment, highly inclined orbit configuration, it was found that satisfactory earth coverage could be accomplished with forty-eight (48) low-earth orbiting satellites. These satellites could be arranged in six (6) highly inclined orbiting planes, eight (8) satellites per plane. Other configurations could be used. Other lower inclined orbiting arrangements would require substantially more satellites in order to achieve the same coverage of the earth as highly inclined configuration.

Each satellite contains a satellite switching unit, suitable antennas 11 (helicals antennas for up/down links and lenses for cross links, for example) and an unfolding array of solar cells 12 along with storage batteries (not shown) connected to the solar cells to provide power for the switching unit. The satellite buses or vehicles themselves are low-earth orbiting satellites such as those commercially available. The satellites are put into orbit by a launching vehicle. When in orbit, the solar cell array is opened and the switching unit thereby activated. The satellites are then individually brought on line via standard telemetry, tracking and control (TT&C) channels to form the network.

As shown in FIG. 1, a user A with a handheld telephone goes off-hook. This request for a channel is received by a particular satellite 1, as shown in FIG. 1. A frequency channel is assigned to the user and the caller's desired number is then routed through the system. Each satellite is a distributed local processor and determines how switching of the call is to occur. Satellite i switches the call to the appropriate cell contained either within its own cell complement or to the appropriate satellite cell complement. The path is determined by each satellite switching unit until the call is received by satellite 2. Satellite 2 then routes this call to the particular handheld user B shown in FIG. 1.

Although two handheld users are shown, the users may be on the water, in a moving vehicle, airborne or part of a PSTN where the link is through a gateway. Each satellite is a local processor. The system determines to which appropriate satellite or cell the call is to be switched. Each satellite determines an optimal path from itself to the next appropriate satellite. These determinations may be made based upon the office code portion of the telephone number of the called user.

Figure 3:
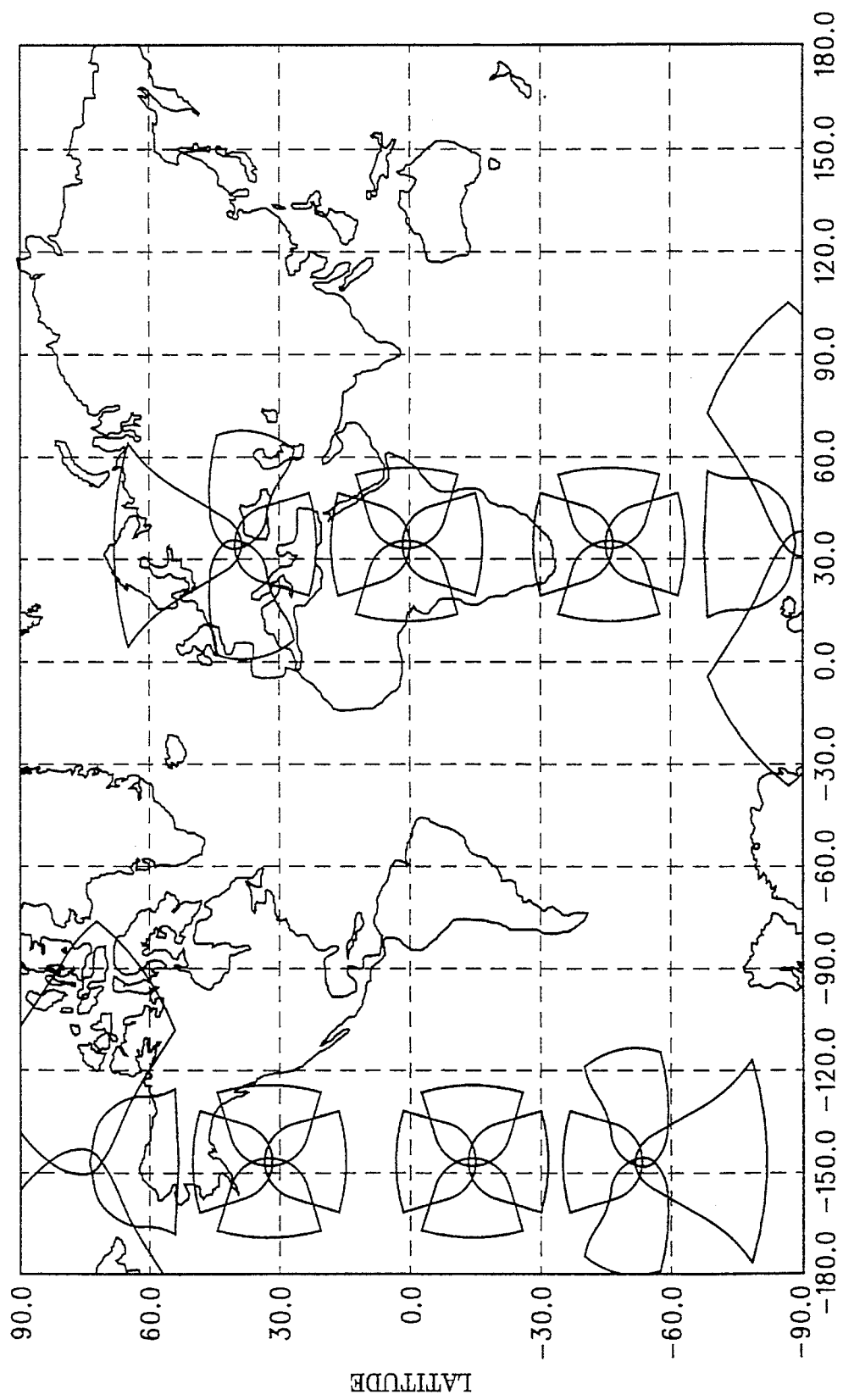
FIG. 3 is a projection of the areas served by a plane of cellular satellite switches about the earth.

Each satellite typically may project four (4) or more lobes onto the earth and contain four (4) or more corresponding cells for switching. These lobes of coverage are achieved via antennas (helical typically) with fixed beam widths appropriate to the number of lobes. Overlapping cells will be differentiated using present cellular techniques. These areas or lobes are shown in FIG. 3 for one particular plane of satellites about the earth. This figure depicts a high inclined orbiting satellite cellular switches. Each satellite determines the optimal path from it to the next satellite through which to route a particular call or data transmission. These satellite switches operate on data packets and therefore may transmit digital voice or data. Downlink and uplink data/digital voice is received on an FDM basis demodulated and then packetized for satellite-to-satellite communication.

Figure 2:
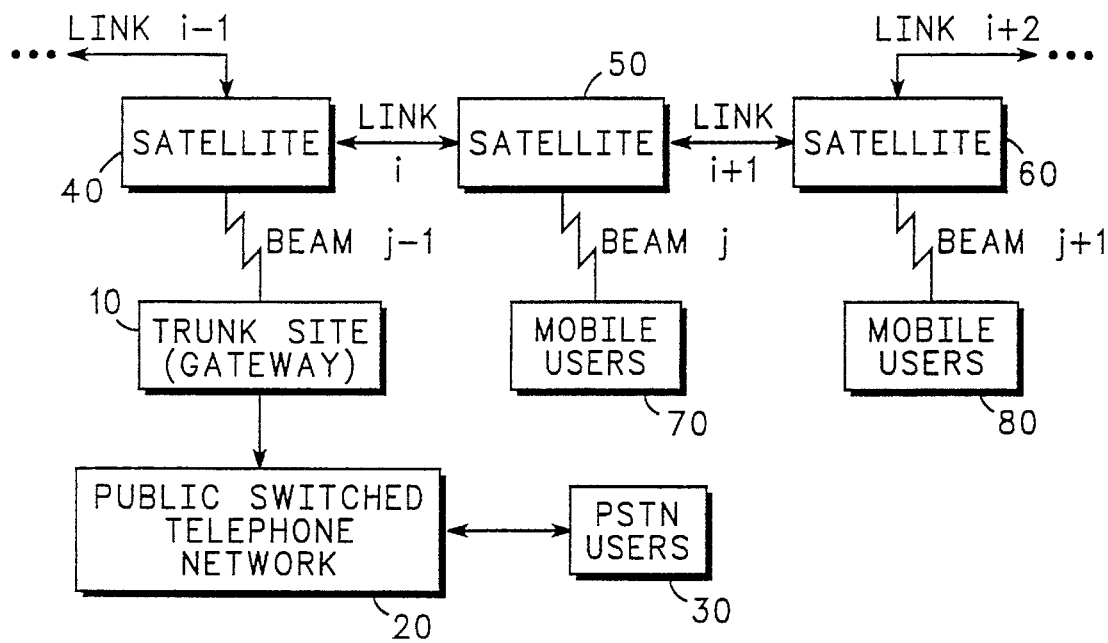
FIG. 2 is a block diagram depicting the interconnection of the satellite switching units with its association mobile users and interconnection to the public switched telephone network.

FIG. 2 depicts the interconnection of a portion of one plane of satellites. In addition, the connection of the satellite to the satellite's corresponding mobile users and to the public switched telephone network is shown. Three satellites are shown. Satellite 40, Satellite 50 and Satellite 60. Satellite 40 is connected to Satellite 50 by link i. Satellite 50 is connected to Satellite 60 by link i+1. Satellite 60 is connected to the next sequential satellite of the plane (not shown) via link i+2. Satellite 40 is connected to the next preceding satellite (not shown) via link i−1. Each plane of satellites forms a ring of connected satellites around the earth.

As previously mentioned, the drawing of FIG. 2 shows one plane of the satellites. In addition, each satellite is connected to one or more satellites in other orbiting planes. That is, each satellite is connected to a previous and next satellite in its orbiting plane and to one or more satellites in other orbiting planes.

The intersatellite links link i−1, link i, etc. may be implemented via data transmission on a microwave beam or via a laser beam. Existing technologies currently provide for such data transmission.

Connection between the satellites and its mobile users is achieved by beams j−1, j and j+1, for example. These beams correspond to the lobes shown in FIG. 3 and to the switching cells mentioned above. These beams are achieved via the satellite up/down link antennas which provide communication to users via the users omni-directional antenna. The limit on the number of users that a particular satellite may handle at one time depends on bandwidth allocated plus power available on the satellite. Typically this number may be 50,000 users per satellite.

Satellite 40 is shown connected to a trunk site or gateway 10 via beam j−1. Any satellite, such as Satellite 40, is capable of transmitting and receiving data from a gateway, such as gateway 10. This gateway link can be accomplished using the packetized data similar to the satellite-to-satellite links.

Gateway 10 includes units which interconnect to the public switched telephone network (PSTN) 20. All public switched telephone network users 30 are connected to the public switched telephone network 20. As a result of the satellite 40 being connected through gateway 10 to PSTN 20, a mobile user of the satellite cellular system which is connected directly via a beam to a satellite may transmit voice or data via the satellite structure (satellite-to-satellite via corresponding links), through gateway 10, through the public switched telephone network 20 to selected users of the PSTN 30 or vice versa.

Each satellite provides several data transmission beams. These data transmission beams project the lobes of coverage shown in FIG. 3 which depicts four beams. Each satellite projects four such lobes. As shown in FIG. 2, a satellite may use one or more of its beams to provide interface to a gateway. At least one beam is required for establishing a link between each gateway and the satellite. Typically a satellite links to only one gateway. One gateway provides sufficient trunking to interconnect a number of mobile users to the public switched telephone network 20.

Each satellite performs internal switching among its four beams or cells. This is analogous to intraoffice switching for conventional telecommunication systems.

The up/down linking arrangement between the satellites and its mobile users or gateways via the beams may transmit and receive data in the range of approximately 2.1 to 3.9 GHz, for example. The present technology and band availability makes this a preferred data transmission range. However, the scope of the present invention is not limited to data transmission exclusively within this range.

As previously mentioned, the data (digital voice or data) is transmitted in packet form. As a result, high-speed data transmission as well as voice data transmission may be accomplished via the satellite system. Data transmission rates, given the present available bandwidths, are a least 1200 baud. However, with extended bandwidth, substantially higher data rates can be achieved by this system.

Figure 4:
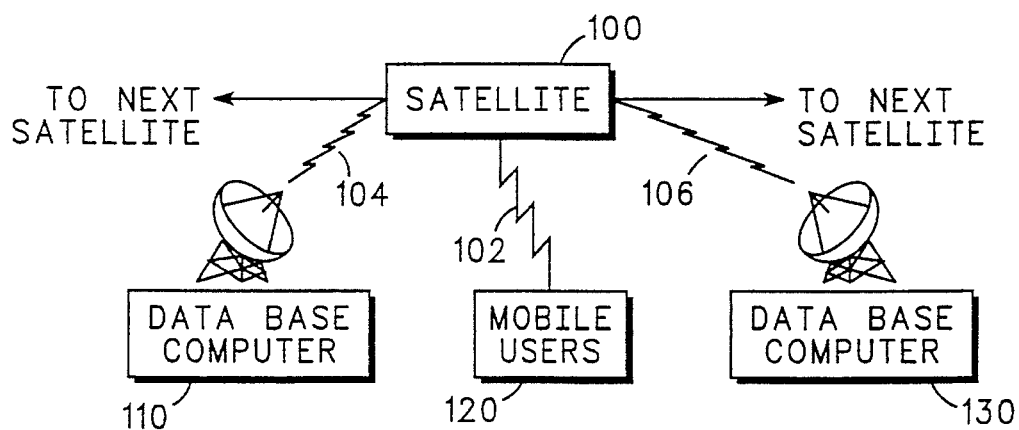
FIG. 4 is a block diagram of a data base arrangement for a satellite cellular communication system.

FIG. 4 depicts one satellite switching unit 100 directly connected to mobile users 120 via beam 102. Satellite 100 is connected to data base computer 110 via beam 104. Satellite 100 is also connected to data base computer 130 via beam 106. This connection may be direct via a beam 106 as shown in FIG. 4 or indirect through other satellites to data base computer 130.

A mobile user might "roam" or travel in a home area. The home area may be a city, such as New York, Los Angeles, etc. The data base computer 110 contains all the information relative to each of its mobile users. As long as a particular mobile user is operating within his home area, all the available information concerning that user is available at the local home area data base computer.

If, for example, a home area user in Los Angeles travels to New York City and attempts to use his satellite cellular telephone for communication, the data base computer in the user's new area, New York City, is not aware of the existence of that user. If data base computer 110 is the mobile user's home area, Los Angeles, data base computer 110 has all the information for this particular mobile user. As a result, the mobile user would not be allowed to place calls because he was not recognized by his home area's data base computer.

In order to overcome this problem, each mobile user is periodically interrogated by the system as to its location so when he goes off-hook, his call for service can be recognized and routed. However, since the data base of a particular user is stored in his home area data base computer via the satellite system, the satellite system first interrogates the home area to determine that he is no longer there and to obtain the user's switching information. When that determination is made, the new home area's data base computer can be updated to include this "roaming" user. As a result, this user is then allowed to originate and receive calls in his new area. Because the satellite system interrogates the user's home data base computer to determine his location, the user can be found throughout the entire satellite system. Thus, the system provides the capability for finding "roaming" users and establishing communications with them.

To facilitate tracking of each mobile user, each mobile telephone provides a control signal which is periodically monitored so that when a subscriber originates a call, the nearest satellite can track him and through the satellite network interrogate his home data base computer to determine his pertinent customer information. The mobile telephone may automatically indicate to the satellite network a new location for updating the data base computer. This control signal allows the incoming calls of "roaming" users to be validated via satellite-to-satellite linking to the home area's data base computer.

Each satellite in the satellite cellular communication system is self-navigating. That is, it uses the Global Positioning Satellite system (GPS) or time and ephemeris data from which to compute its location information. In addition, from the fixed location of the Global Positioning Satellite system or other vehicle, each satellite can determine its position and alter its course accordingly to stay within its proper orbit while providing switching services.

Each satellite may switch a call intrasatellite (within the particular switching unit or cell) or may connect the call via a microwave or laser links (link i, i+1, etc.) to another satellite within its plane or out of plane (adjacent). Each satellite may distinguish a particular telephone number and determine whether that number is within its own calling area or the area of another satellite. If it is within the area of another satellite, the call is cross-linked to the next appropriate satellite or cell which makes the same determination until the satellite serving that telephone number is reached. That satellite down-links to the particular mobile user sought to be called. Due to this structure, the satellite network provides a distributed nodal switching capability. Each satellite is a local switch for a particular area, but the area is constantly changing. Therefore, calls are handed-off as satellites move out of the range of a particular telephone user.

Various multiplexing techniques (i.e. FDMA, TDM CDMA, etc.) may be used to enhance the transmission capability between various satellites on the links as shown in FIG. 2.

Since the switching units of this system are orbiting the earth and relatively secure from tampering, this system provides the capability to support secure voice and data transmission via data encryption and decryption techniques commonly known in the art. Since the switching units enjoy the security of being hundreds of miles above the earth, the system also lends itself to military communication applications.

Although the current preferred embodiment of the invention has been illustrated, and that form described in detail, it will be readily apparent to those skilled in the art that various modifications may be made therein without departing from the spirit of the invention or from the scope of the appended claims.

What is claimed is:

1. A satellite cellular system comprising:

users communicating with each other via uplinks and downlinks of a first satellite;

handing-off that ongoing communication from a first cell to a second cell by transferring the ongoing communication from the uplinks and the downlinks of the first satellite to different uplinks and downlinks of another satellite; and handing-off that ongoing communication from a first cell to a second by transferring the ongoing communication from the uplinks and the downlinks of the first satellite to different uplinks and downlinks of the first satellite.

2. A satellite cellular system comprising:

users communicating with each other via cellular uplinks and cellular downlinks of a satellite;

contemporaneously terminating the communication via the cellular uplinks and the cellular downlinks of the communicating satellite and re-establishing the communication via cellular uplinks and cellular downlinks of another satellite, whereby the continuity of the ongoing communication of the users is substantially maintained via the satellite and the another satellite; and contemporaneously terminating the communication via the cellular uplinks and the cellular downlinks of the communicating satellite and re-establishing the communication via cellular uplinks and cellular downlinks of the communicating satellite, whereby the continuity of the ongoing communication of the users is substantially maintained.

3. A satellite cellular system comprising:

means for users communicating with each other via up links and downlinks of a satellite;

means within the satellite for handing-off that ongoing communication from a first cell to a second cell by transferring the ongoing communication to different uplinks and downlinks of another satellite; and means within the satellite for handing-off that ongoing communication from a first cell to a second cell by transferring the ongoing communication to different uplinks and downlinks of the same, satellite.

4. A cellular communication satellite for use in a satellite cellular system comprising:

means for receiving a cellular communication via uplinks and downlinks between users at the satellite;

means within the satellite for handing-off that ongoing cellular communication between the users from a cell of the satellite by transferring the ongoing communication to a cell of another satellite; and means within the satellite for handing-off that ongoing cellular communication between the users from a cell of the satellite by transferring the ongoing communication to a cell of the same satellite.

5. A secure satellite cellular communication system for communicating among a plurality of users comprising:

a plurality of satellite switching means being positioned in orbit;

a plurality of subscriber units, each said subscriber unit for securely communicating with others of said subscriber units via uplinks and downlinks of a first satellite switching means; and means for handing-off the communication between said securely communication subscriber units from a first cell to a second cell by transferring the secure communication to uplinks and downlinks of a second satellite switching means.

6. A cellular communication satellite for use in a satellite cellular system comprising:

means for receiving a cellular communication between users at the satellite;

means within the satellite for handing-off that ongoing cellular communication between the users from a cell of the satellite to a cell of another satellite; and means within the satellite for handing-off that ongoing cellular communication between the users from a cell of the satellite to another cell of the same satellite.

7. A satellite cellular system comprising:

users communicating with each other via uplinks and downlinks of a satellite;

handing-off that ongoing communication from a first cell to a second cell by transferring the ongoing communication from the uplinks and the downlinks to different uplinks and downlinks of another satellite; and handing-off that ongoing communication from a first cell to a second cell by transferring the ongoing communication from the uplinks and the downlinks to different uplinks and downlinks of the same satellite.

* * * * *